United States Patent [19]
Davis et al.

[11] Patent Number: 6,011,883
[45] Date of Patent: Jan. 4, 2000

[54] SWITCH CONTROL COMBINING A LIGHT PIPE AND RESTORE SPRING

[75] Inventors: David R. Davis, Sioux City, Iowa; David Williams, El Paso, Tex.

[73] Assignee: Gateway 2000, Inc., North Sioux City, S. Dak.

[21] Appl. No.: 09/356,760

[22] Filed: Jul. 19, 1999

Related U.S. Application Data

[60] Provisional application No. 60/094,052, Jul. 24, 1998.

[51] Int. Cl.[7] ................................................ G02B 6/26
[52] U.S. Cl. ................................ 385/16; 385/901
[58] Field of Search ........................... 200/314; 385/16, 385/140, 901

[56] References Cited

U.S. PATENT DOCUMENTS

Re. 35,020  8/1995  Quinlan, Jr. ............................. 385/13
5,706,374  1/1998  Vinchant ................................. 385/16

Primary Examiner—Michael L. Gellner
Assistant Examiner—Nhung Nguyen
Attorney, Agent, or Firm—Laurence R. Letson; Anthony Claiborne

[57] ABSTRACT

A light conductor and restore spring assembly is made of molded light translucent material which exhibits a significant degree of deflectability and the further ability to rebound or restore to its original shape when released. The framework of the spring forms a light conductor. If the light path needs to be deviated from a straight path the framework of the spring may have reflective surfaces formed into the body of the assembly to reflect the light rays from the input end to the diffusing end of the light path. The external surfaces of the spring/light conductor assembly constrain the light loss by reflecting the light back into the assembly and redirecting it along its path and toward the reflective surfaces or the diffusing end of the light pipe.

18 Claims, 3 Drawing Sheets

SWITCH CONTROL COMBINING A LIGHT PIPE AND RESTORE SPRING

CLAIM OF PRIORITY

The inventors of this invention claim priority from copending Provisional Application Ser. No. 60/094,052, filed Jul. 24, 1998.

FIELD OF THE INVENTION

This invention relates to a light transmission function combined with a spring restoration function advantageously applied to a switch control and, more specifically, to a device of molded light translucent material capable of accepting deformation and restoring itself from such, thereby acting as a spring while controlling and conducting light from a light source to a display point.

BACKGROUND OF THE INVETION

Indicator lights are especially desirable to show a condition of a computer, display, disk drive or other appliance. One of their most common uses is to provide an ON/OFF indication. An ON/OFF indicator typically is closely located to its related ON/OFF switch or control.

Previously, discreet LED's have been disposed so that the light emitting surface of the LED projects through an aperture in the face plate of the device. This requires a mounting device, wiring, circuit board or another support for the LED as well as the switch actuator to be located together in a small area. This may not only congest the area but complicate assembly.

As multiple functions are incorporated into an assembly process, the assembly typically not only includes multiple parts, requires additional assembly time and expertise, but also is a more complex operation.

In the manufacturing operation, there is a continuing goal of reducing part counts, assembly labor time and complexity. These reductions result in savings which translate into improved profitability or the opportunity to reduce prices for the product.

OBJECTS OF THE INVENTION

It is an object of the invention to combine into a single device both light transmission and spring restoration of a manually activated member.

It is another object of the invention to provide a spring restoration function with an indicator function, indicating a related condition controlled by a spring restored member.

It is a further object of the invention to reduce congestion in the switch and indicator area by simplifying the assembly of a device by conducting light to a desired indicator location, and then combining the light conduction function with the spring restoration function.

SUMMARY OF THE INVETION

A spring device having an anchoring portion and a spring segment is preferably molded from a translucent material such as a polycarbonate to conduct light. The spring device incorporates both a light collection surface and a light diffusion surface to collect light from an indicator or LED. The device conducts collected light to a diffusing surface that serves as an indicator light or lens. Additionally, the spring portion acts first to resist any distortion, then to utilize the distortion stored energy to rebound to the spring's original configuration and to restore a push button, in turn, which engages and activates the switch.

The translucent material also may comprise internal reflecting surfaces molded into the structure. The reflective surface may be formed by an insert in the molding cavity, creating a smooth external surface oriented at an angle to the path of a light beam within the translucent material in order to reflect and redirect the light beam. Additionally, if smooth, the outer surfaces of the translucent material will form constraining surfaces to constrain and contain the light within the structure. If the angle of incidence on the wall is low, any light impinging upon the external smooth outer surfaces from within the translucent structure will be redirected into the translucent structure rather than the light being permitted to escape the exterior walls.

Whenever the light pipe formed of the translucent material is straight, the sides of the light pipe, the constraining surfaces, reflect and redirect scattered light rays back into the light pipe and toward the diffusing exit lens surface. Straight light pipes may not require internal reflecting surfaces.

A DETAILED DESCRIPTION OF THE PREFERRED EMBODIMENT

OF THE BEST MODE OF THE INVETION AS CONTEMPLATED BY THE INVENTORS

Figure 1:
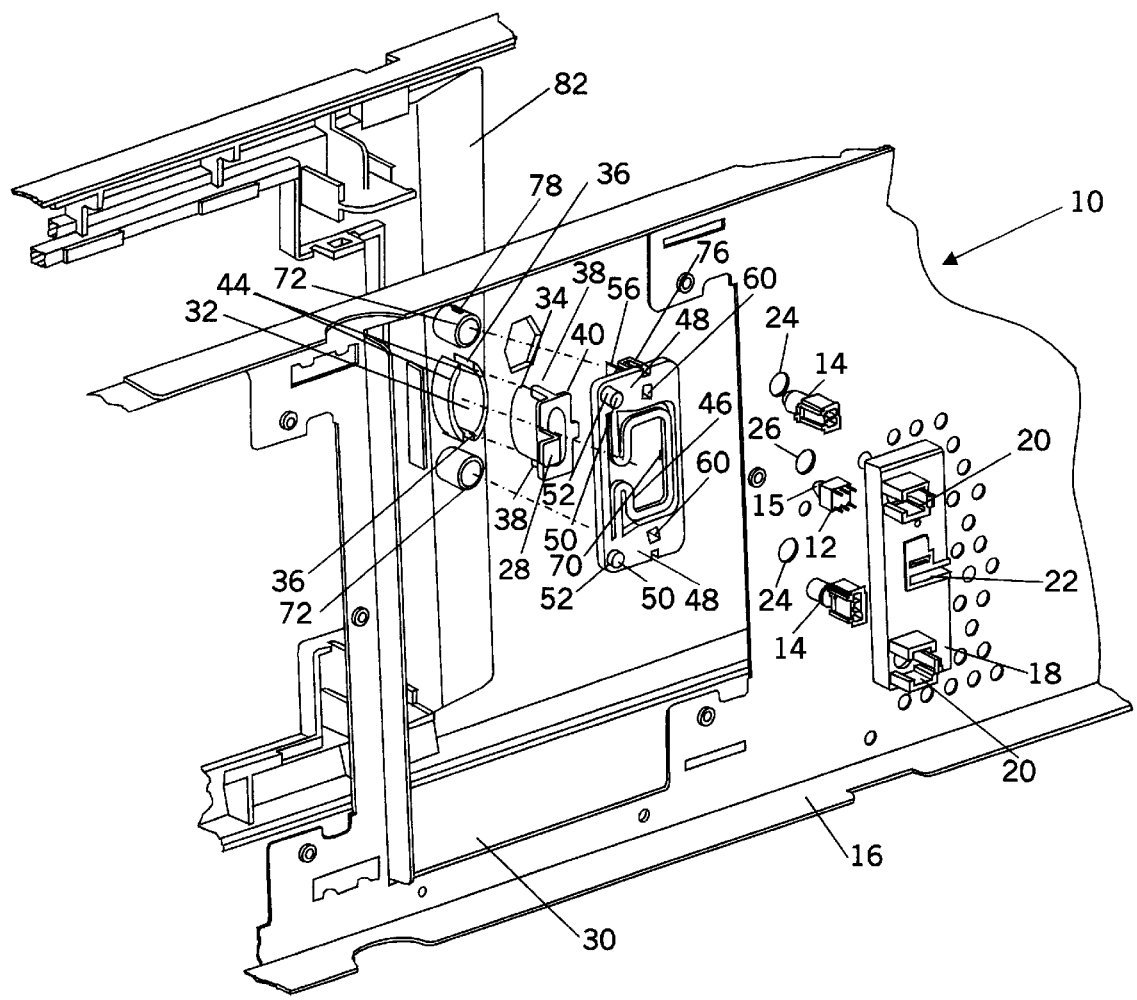
FIG. 1 is an exploded view of a first embodiment of a partial computer system unit or tower showing a combination light pipe and restore spring and illustrating its implementation in computer system units.

A computer system unit 10, also referred to as a tower 10, is typically provided with a push to activate "ON/OFF" switch 12 for controlling electrical power to the system unit 10 and other units of the computer. To indicate the state of the computer or a subassembly thereof, it also is common to provide indicator lights 14, which usually are Light Emitting Diodes or LED's. LED's 14 are generally compact, reliable and inexpensive. The ON/OFF switch 12 is actuated by the switch actuator portion 15 being pushed into switch 12. Switch actuator portion 15 typically is engaged by a push button 34 or an intermediate member, such as spring 46.

It is very desirable to mount the ON/OFF switch 12 on the tower frame or housing 16, but installation in other locations using the invention may prove advantageous also. A particularly beneficial technique for mounting either the ON/OFF switch 12 or status indicating LED's 14 features a control panel 18, which permits assembly of the various items into a subassembly for ease in further assembly. The LED's 14 are inserted into sockets 20 of control panel 18, the ON/OFF switch 12 is inserted into socket 22 of control panel 18, and the control panel 18 is assembled to tower frame 16. The LED's 14 and the ON/OFF switch 12 are electrically connected as is conventional and well-known.

With control panel 18 attached to tower frame 16, LED's 14 align with the plurality of holes 24 in tower frame 16 and protrude therethrough. ON/OFF switch 12 aligns with and extends through opening 26 in tower frame 16.

Bezel 30 forms the front of the completed tower 10 or system unit 10 and has formed therein, a channel 32 extending inwardly toward the tower frame 16. Channel 32 accepts and guides ON/OFF push button 34. The guiding function of channel 32 is assured for ON/OFF button 34 by slots 36 acting to receive and guide ribs 38 of ON/OFF button 34, permitting a reciprocating movement of ON/OFF button 34 within channel 32.

ON/OFF button 34 is formed with a foot 28 extending from the bottom of the ON/OFF button 34. ON/OFF button 34, particularly foot 28, is disposed to engage the actuating portion 15 of ON/OFF switch 12 or the deflectable portion of serpentine restore spring 46, at surface 70.

Restore spring 46, a torsion spring, incorporated into this embodiment in a serpentine shape, provides restore forces to ON/OFF button 34 in order to restore button 34 to its projecting or extended position, extending from the front of the bezel 30 and to the maximum extent possible, with flange 40 of ON/OFF button 34 positioned against the end surface 44 of channel 32.

The restore spring 46 takes the form of a serpentine portion of a molded plastic light pipe or light transmission member 48 in this embodiment. The light pipe member 48 accepts light from the LED's 14 through collecting lenses 50.

With the LED's 14 extending through holes 24 in frame 16, the LED's 14 are positioned adjacent to collecting lenses 50 for maximum light transfer efficiency. The light transmission member 48, also referred to as a light pipe 48, is a molded segment of light transmissive material, preferably a polycarbonate, which transmits the light collected at collecting lens 50. Each collecting lens 50 is disposed on a raised chimney 52. At the base of the chimney 52, a reflective formation is molded within the light pipe 48, best observed in FIG. 2.

Figure 2:
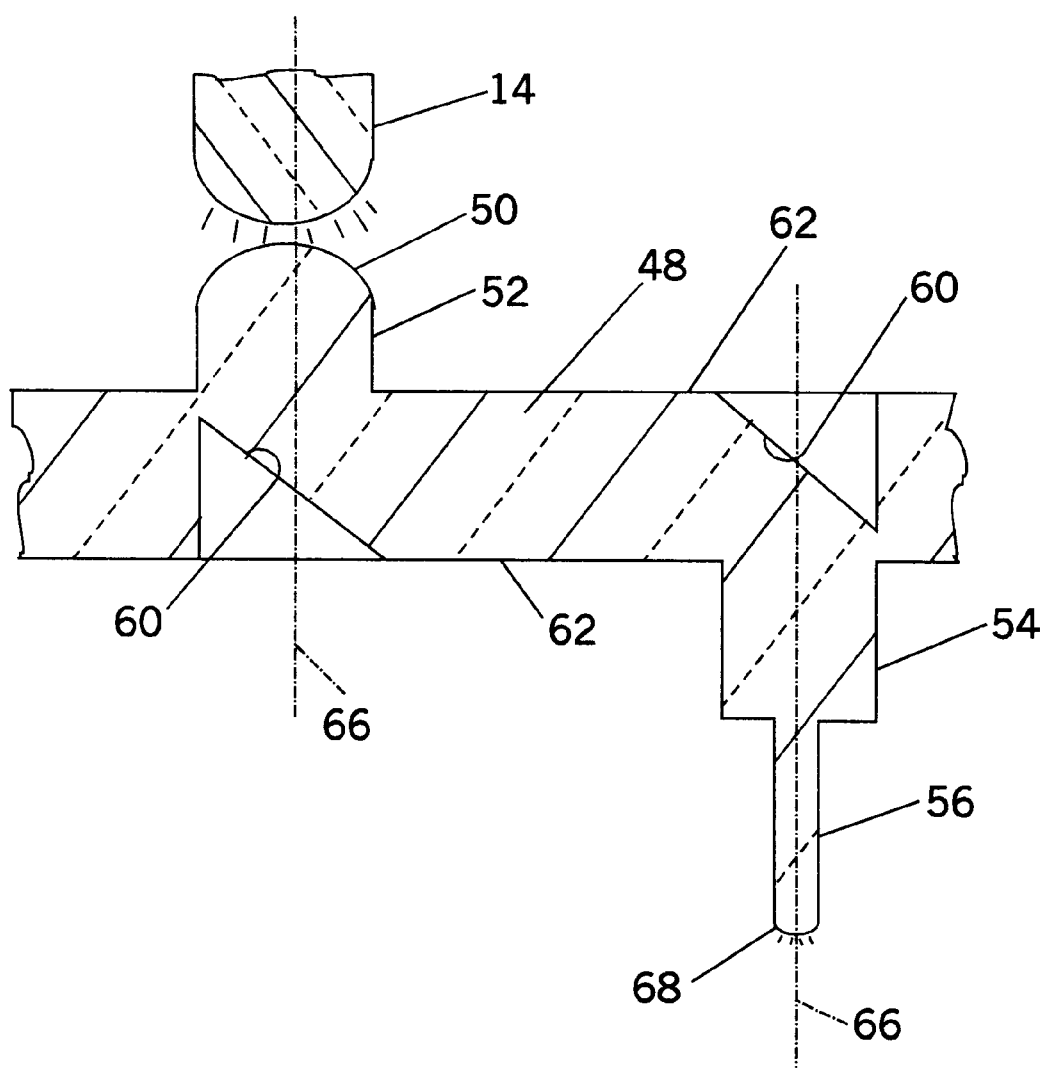
FIG. 2 is a sectional view of the light pipe taken through collecting and indicator lenses as illustrated in FIG. 1.

FIG. 2 is a sectional view taken through the chimney 52 supporting collecting lens 50 and a second raised chimney 54 supporting a light blade 56.

The light rays from LED 14 are transmitted by light pipe 48. Light rays entering a collecting lens 50 are focused into and transmitted by the chimney 52 into light pipe 48. Unless redirected by a surface of the medium, light rays in a polycarbonate light pipe or within any similar light transmissive medium will travel in straight lines or paths. A redirecting or constraining surface is a reflective surface, such as an external surface of the structure. The amount of light reflected, as opposed to scattered, is dependent upon the smoothness of the surface. A very smooth surface will act more like a mirror and be more efficient as a reflector; a rough surface will tend to scatter and diffuse the light. Light rays striking a surface at approximate perpendicularity will pass through the surface and either enter or exit the light pipe depending upon whether the rays striking the surface are internal or external to the light pipe, such as light pipe 48.

The light pipe 48 is formed by molding a molten or fluid polycarbonate into a desired shape. In the present instance, the light pipe 48 is a flat bar or member supporting the chimneys 52, 54. The intentional redirecting of the light path of rays is accomplished by reflective surfaces 60. Surfaces 60 are disposed at angles that will reflect light to another of the reflective surfaces 60 disposed at a distance from the first surface 60. In the present and preferred embodiment, the reflective surfaces 60 may be oriented at slightly less than 45° from the exterior surface 62 of the light pipe 48. If the reflective surface 60 spans the entire thickness of the light pipe 48, a 45° orientation would be appropriate. The orientation of the reflective surfaces 60 about axes 66 of chimneys 52, 54 is accomplished by rotation of an insert (not shown) within the mold, thereby producing surfaces that align the reflected light path with a second reflective surface 60.

Thus, light rays entering (collecting) lens 50 from an LED 14 are directed by reflective surfaces 60 to indicator lens 68, thereby causing indicator lens 68 to illuminate, radiate and diffuse, serving as a visual indicator. The reflective surfaces 60 may be formed by using a highly polished surface on a mold insert. This results in a very smooth, highly reflective, molded surface in the molded object. The geometrical parameters of the mold insert control the angular disposition of the reflective surfaces 60.

The resilient characteristics of polycarbonate permit the light pipe 48 to incorporate in the same mold structure a deflectable torsion spring 46. The torsion spring 46 is provided with a contact surface 70 which is engaged by flange 40 of ON/OFF button 34. Thus, any depression of ON/OFF button 34 into channel 32 twists or distorts torsion spring 46, storing the energy necessary for restoration of both torsion spring 46 and ON/OFF button 34. The serpentine shape of spring 46 permits storing sufficient energy to restore ON/OFF button 34 to its non-depressed state without concentrations of stress sufficient to crack or break torsion spring 46. The serpentine shape also allows storage of more energy than a straight beam or torsion spring because of the additional spring length being incorporated into the spring structure.

Chimneys 54 and the corresponding lenses 68 are accommodated by tubular formations 72 in the structure of bezel 30 which communicate with openings (not shown) in the face of bezel 30, thereby permitting observation of lenses 68 from the front of computer system unit 10.

Further, relying on the semi-flexible characteristics of polycarbonate and similar materials, the light pipe 48 is provided with deflectable latches 76 on each end of the light pipe 48. Deflectable latches 76 are engageable with latch surfaces 78, on the exterior of tubular formations 72, to detachably mount light pipe 48, chimneys 54, blades 56, and lens 68 on bezel 30. Other equally effective and known techniques for mounting the light pipe/spring assembly may be used.

Figure 3:
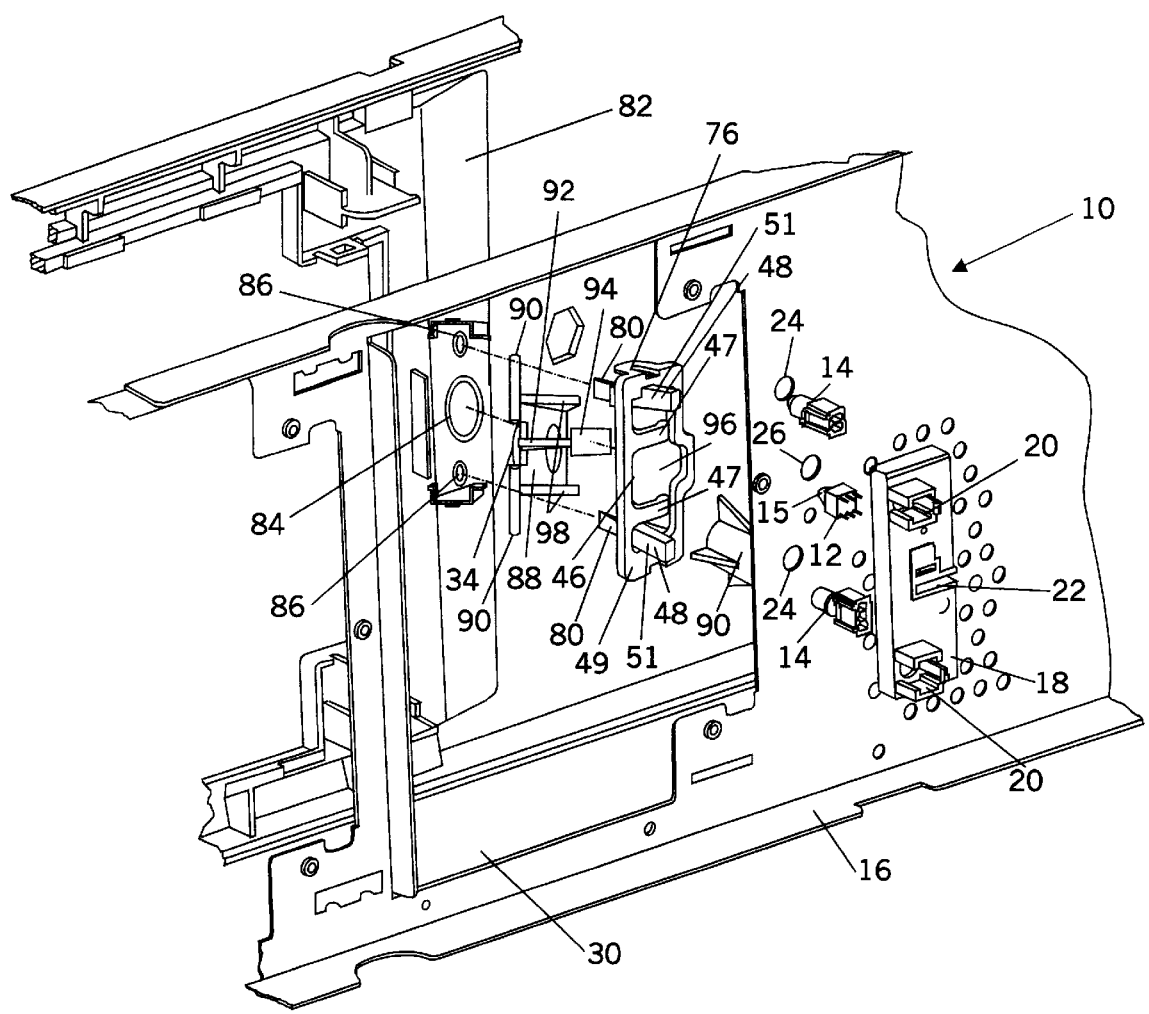
FIG. 3 is an exploded view of a second embodiment of a partial computer system unit or tower showing a combination light pipe and restore spring and its implementation in computer system unit.

A second embodiment of the of the invention is illustrated in FIG. 3. A partial segment of the system unit 10 is illustrated with the frame 16 defining a plurality of holes 24 and openings 26 which receive light emitting diodes or LED's 14 or the actuator portion 15 of an ON/OFF switch 12 similar to their counterparts in FIG. 1.

A light pipe 48 is preferably aligned with each of holes 24 to receive light from an LED 14. Light pipe 48 or light transmission member 48 is formed with an end 80 fabricated to project into and through apertures 86 in face panel 82 of system unit 10 to be visible from outside the system unit 10. Face panel 82 may incorporate tubular formations and retaining latch surfaces similar to tubular formations 72 and latch surfaces 78, if desired, as shown in FIG. 1.

Integrally formed or molded with light pipes 48 is a torsion restore spring 46. Torsion restore spring 46 includes a frame 49 and deflectable arms 47 extending from the torsion spring section of frame 49. Light pipe 48, restore spring 46, frame 49 and deflectable arms 47 becomes an entire assembly unitarily molded of polycarbonate or other light transmissive material which also exhibits spring characteristics. Polycarbonate is a preferred candidate because it not only possesses light transmission characteristics but also is capable of elastic deformation and restoration.

Face panel 82 forms an access port 84 into which pushbutton 34 projects. Face panel 82 also forms viewing ports 86 through which the ends 80 of light pipes 48 project and are viewed from the exterior of system unit 10.

Push button 34 is caused to project through access port 84 by a pivotable member 88. Member 88 is pivotally attached to the back surface of face panel 82 and pivots about shaft 90. Integrally formed with pivotable member 88 is an actuator 92 which is similarly pivotable about an axis formed by shaft 90. Pivotable member 88 has a paddle or engaging surface 94 for engagement with the actuator 15 of ON/OFF switch 12. Engaging surface 94 projects through central opening 96 in restore spring 46 to engage actuator 15 without interference from frame 49 surrounding central opening 96. Pivotable member 88 is similarly provided with camming arms 98 which extend to engage deflectable arms 47 of restore spring 46.

The displacement of push button 34 will cause member 88 to pivot about shaft 90 and cause camming arms 98 to deflect arms 47. Deflection of arms 47 torsionally deforms restore spring 46 by twisting restore spring 46 against the restraint of restore spring frame 49. As push button 34 is released the torsional energy stored in deformed restore spring 46 will move the restore arms 47 and camming arms 98 of pivotal member 88 back to their at-rest, restored position, thereby also restoring push button 34 to its at-rest position.

Light pipe 48 of FIG. 3, being straight, does not require reflective surfaces similar to surfaces 60 in FIG. 2. Light pipes 48 are integral parts of frame 49 of restore spring 46. Light pipe 48, as shown in FIG. 3, has light constraining and guiding surfaces 51 which are the exterior surfaces 51 of light pipes 48. Spring 46, in addition to supporting and being twisted by a displacement of camming arms 47, acts to further anchor frame 49 once engaged with frame 10, in one of various ways well-known in the art or by retention devices, such as tubular formations 70 and latch surfaces 78, as shown in FIG. 1.

Spring 46 is torsionally deformed by pivoting displacement of the deflectable arms 47 resulting from the motion of camming arms in 98. As push-button 34 is released, the energy stored in the torsionally deformed spring 46 will restore the arms 47 to further restore camming arms 98 and push button 34.

This invention has been described with respect to its preferred embodiment with the understanding that the invention, depending upon its implementation, may take the form of one of various different embodiments. Accordingly, by use of the teachings hereof, one of skill in the art may make changes in the implementation of the invention without removing the changed implementation from the scope of this invention, as defined by the attached claims.

We claim:

1. A light conductive restore spring assembly comprising:
   a light conductive member fabricated of a light conducting material;
   a segment of said light conductive member subject to deformation;
   an anchoring portion of said light conductive member integral to said deformable segment and resistive to forces exerted thereon by deformation of said deformable segment;
   at least one light collecting surface formed on said assembly;
   at least one light diffusing surface formed on said assembly, and
   light directing surfaces intermediate said light collecting and said light diffusing surfaces for directing light from said light collecting surface to said light diffusing surface.

2. The light conductive restore spring assembly of claim 1 wherein said light directing surfaces are disposed in said anchoring portion of said spring assembly and are internally reflecting surfaces disposed to direct said light internally of the said spring.

3. The light conductive restore spring assembly of claim 2 wherein said deformable segment is deformable in a torsional direction.

4. The light conductive restore spring assembly of claim 2 wherein said light directing surfaces reflect light impinging on said surfaces thereby confining said light with in said light conductive spring assembly.

5. The light conductive restore spring assembly of claim 4 wherein said surfaces are at least external surfaces of said anchoring portion.

6. The light conductive restore spring assembly of claim 4 wherein said surfaces are formed into and within said anchoring portion.

7. The light conductive restore spring assembly of claim 6 wherein said surfaces result from cavity formed into said anchoring portion.

8. The light conductive restore spring assembly of claim 4 wherein said light directing surfaces constrain light, introduced through said light collecting surfaces, from exiting said anchoring portion except through said light diffusing surface.

9. The light conductive restore spring assembly of claim 8 wherein said light constraining surfaces form a light pipe and said light pipe comprises a portion of said anchoring portion.

10. A computer system unit housing comprising:
    a frame;
    a face plate covering at least one face of said frame;
    a switch mounted on said frame;
    a switch control disposed in moveable relation on said face plate;
    at least one indicator light source mounted on said frame;
    at least one aperture in said face plate for observing the condition of said light source;
    a light conductive restore spring assembly disposed to collect and conduct light from said light source to said aperture and for resisting movement of said switch control relative to said switch and restoring said switch control to a position displaced away from said switch, said light conductive restore spring assembly further comprising:
    a segment of said light conductive restore spring assembly;
    an anchoring portion integral to said segment subject to deformation and resistive to forces exerted thereon by deformation of said segment subject to deformation;
    at least one light collecting surface formed on said assembly;
    at least one light diffusing surface formed on said assembly, and
    light directing surfaces intermediate said light collecting and said light diffusing surfaces for directing light from said light collecting surface to said light diffusing surface.

11. The computer system unit of claim 10 wherein said light directing surfaces are disposed in said anchoring portion of said spring assembly and are internally reflecting surfaces disposed to direct said light internally of the said spring.

12. The computer system unit of claim 11 wherein said deformable segment is deformable in a torsional direction.

13. The computer system unit of claim 11 wherein said light directing surfaces reflect light impinging on said surfaces, thereby confining said light within said light conductive spring assembly.

14. The computer system unit of claim 13 wherein said surfaces are at least external surfaces of said anchoring portion.

15. The computer system unit of claim 13 wherein said surfaces are formed into and within said anchoring portion.

16. The computer system unit of claim 15 wherein said surfaces result from a cavity formed into said anchoring portion.

17. The computer system unit of claim 13 wherein said light directing surfaces constrain light, introduced through said light collecting surfaces, from exiting said anchoring portion except through said light diffusing surface.

18. The computer system unit of claim 17 wherein said light constraining surfaces form a light pipe and said light pipe comprises a portion of said anchoring portion.

* * * * *